United States Patent [19]

Goscenski, Jr.

[11] 3,845,672

[45] Nov. 5, 1974

[54] DIFFERENTIAL DRIVE MECHANISM

[75] Inventor: Edward J. Goscenski, Jr., Battle Creek, Mich.

[73] Assignee: Eaton Corporation, Cleveland, Ohio

[22] Filed: Nov. 8, 1973

[21] Appl. No.: 413,936

[52] U.S. Cl. .................. 74/711, 192/35, 192/103 A
[51] Int. Cl. .......................... F16d 43/08, F16h 1/44
[58] Field of Search .............. 74/711, 710.5, 752 E; 192/105 C, 103 A, 35

[56] References Cited
UNITED STATES PATENTS

| 3,275,115 | 9/1966 | Timberlake et al. ............... 192/35 X |
| 3,461,746 | 8/1969 | Schwerdhofer .................... 74/752 E |
| 3,606,803 | 9/1971 | Ottemann ............................. 74/711 |

FOREIGN PATENTS OR APPLICATIONS

| 1,809,141 | 6/1970 | Germany .......................... 74/752 E |
| 606,356 | 8/1948 | Great Britain ........................ 74/711 |

*Primary Examiner*—Samuel Scott
*Assistant Examiner*—P. S. Lall
*Attorney, Agent, or Firm*—Teagno & Toddy

[57] ABSTRACT

An improved differential drive mechanism includes a differential gear arrangement mounted on a carrier which is rotated during the transmission of drive forces between driving and driven members. A clutch is engagable to retard relative rotation between the driving and driven members. A clutch actuator assembly includes a pair of flyweights which are rotated about a central axis of the actuator assembly at a speed which varies as a function of variations in the speed of relative rotation between the driving and driven members. Upon the occurrence of a predetermined rate of relative rotation between the driving and driven members, the flyweights move outwardly to engage a stop member and initiate engagement of the clutch. The flyweights cooperate with each other in such a manner that if one of the flyweights tends to move outwardly away from the central axis of the actuator assembly under the influence of a centrifugal force resulting from carrier rotation, the other flyweight holds the one flyweight against outward movement. The cooperation between the flyweights is such that they can both move simultaneously outwardly under the influence of a centrifugal force resulting from rotation of the flyweights about the central axis of the actuator assembly.

19 Claims, 7 Drawing Figures

PATENTED NOV 5 1974 3,845,672

DIFFERENTIAL DRIVE MECHANISM

BACKGROUND OF THE INVENTION

This invention relates generally to a drive mechanism and more specifically to a slip limiting drive mechanism having a clutch actuator assembly which responds to relative rotation between driving and driven members and does not respond to carrier rotation.

A known differential drive mechanism having a clutch assembly which is actuated in response to relative rotation between driving and driven members is disclosed in U.S. Pat. No. 3,606,803 issued to Ottemann. This differential drive mechanism includes an actuator assembly having a pair of flyweights. A drive arrangement rotates the flyweights about a central axis of the actuator assembly to subject the flyweights to a centrifugal force which varies as a function of variations in the speed of relative rotation between driving and driven members. Upon the occurrence of a predetermined speed of relative rotation, one of the flyweights will move outwardly unnly the infuence of centrifugal force and engage a stop element to initiate operation of a clutch assembly to an engaged condition.

The flyweights in the drive mechanism disclosed in the Ottemann patent are also free to move outwardly under the influence of a centrifugal force which results from the rotation of a gear carrier about its central axis during the normal transmission of power and without relative rotation between driving and driven members. To prevent a flyweight from effecting engagement of the clutch assembly as the flyweight moves outwardly under the influence of carrier rotation, Ottemann moves the stop element away from the flyweights under the influence of centrifugal force resulting from carrier rotation.

Under certain operating conditions, a flyweight of this known differential drive mechanism may tend to move outwardly under the combined influence of a centrifugal force resulting from carrier rotation and a centrifugal force resulting from rotation of the flyweights about the central axis of the actuator assembly. Since the centrifugal force caused by rotation of the flyweights about the central axis of the actuator assembly varies as a function of variations in the speed of relative rotation between the input and output members, a flyweight may tend to move outwardly under the combined influence of the two centrifugal forces in the absence of the predetermined speed of relative rotation between the input and output members. In fact, it is believed that under certain operating conditions the centrifugal force caused by carrier rotation may cause the flyweights of this known drive mechanism to move outwardly even if there is only a slight degree of relative rotation between the input and output members.

SUMMARY OF THE INVENTION

The present invention relates to a drive mechanism having differential gearing which is enclosed within a carrier or casing such as that used in a transfer case of a four wheel drive vehicle or an axle differential for a vehicle drive. During the transmission of power between the input and output members, the carrier is rotated about its central axis. Upon the occurrence of a predetermined rate of relative rotation between the input and output members, an actuator assembly is effective to initiate operation of a clutch to an engaged condition to retard the relative rotation. The actuator assembly includes a pair of flyweights which are rotated about a central axis of the actuator assembly at a speed which varies as a function of variations in the rate of relative rotation between input and output members. Thus, the flyweights are subjected to two centrifugal forces; that is, a centrifugal force resulting from rotation of the flyweights with the carrier about its central axis and a centrifugal force resulting from rotation of the flyweights about the central axis of the actuator assembly.

The present invention prevents outward movement of the flyweights under the influence of the centrifugal force resulting from carrier rotation. The flyweights move outwardly only under the influence of the centrifugal force resulting from rotation of the flyweights about the central axis of the actuator assembly. Therefore, the flyweights move outwardly and initiate engagement of a clutch assembly only when a predetermined speed of relative rotation is present between the input and output members.

Rotation of the carrier about its central axis subjects the flyweights to a centrifugal force tending to urge one of the flyweights outwardly and the other of the flyweights inwardly. To prevent outward movement of the one flyweight under the influence of centrifugal force resulting from carrier rotation, the flyweights have surfaces which cooperate in such a manner as to block outward movement of only one flyweight at a time. When the flyweights are being rotated about the central axis of the actuator assembly, the flyweights are subjected to a centrifugal force which tends to move both of the flyweights outwardly. The surfaces on the flyweights cooperate to enable both of the flyweights to simultaneously move outwardly under the influence of this centrifugal force.

Accordingly, it is an object of this invention to provide a new and improved drive mechanism having a gear arrangement mounted on a rotatable carrier and an actuator assembly which includes one or more flyweights which move outwardly under the influence of centrifugal force to initiate actuation of a clutch assembly to an engaged condition to retard relative rotation between input and output members and wherein the centrifugal force resulting from carrier rotation is ineffective to move a flyweight outwardly.

Another object of this invention is to provide a new and improved drive mechanism which includes a pair of flyweights which are movable simultaneously outwardly under the influence of centrifugal force and wherein one of the flyweights is prevented from moving outwardly under the influence of a centrifugal force which tends to move only the one flyweight outwardly.

Another object of this invention is to provide a new and improved drive mechanism for interconnecting rotatable driving and driven members and wherein the drive mechanism includes an actuator which is effective to operate a clutch from a disengaged condition to an engaged condition in response to a predetermined rate of relative rotation between driving and driven members and wherein the actuator includes a pair of flyweights having surfaces which cooperate in such a manner as to prevent outward movement of either of the flyweights under the influence of centrifugal forces resulting from carrier or casing rotation and which enables both of the flyweights to move outwardly under the influence of centrifugal forces which vary as a function of variations in the speed of relative rotation between input and output members.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE PREFERRED EMBODIMENT OF THE INVENTION

In this preferred embodiment, the drive mechanism has been described as being used in a transfer case of a four wheel drive vehicle but may have many other uses.

Figure 1:
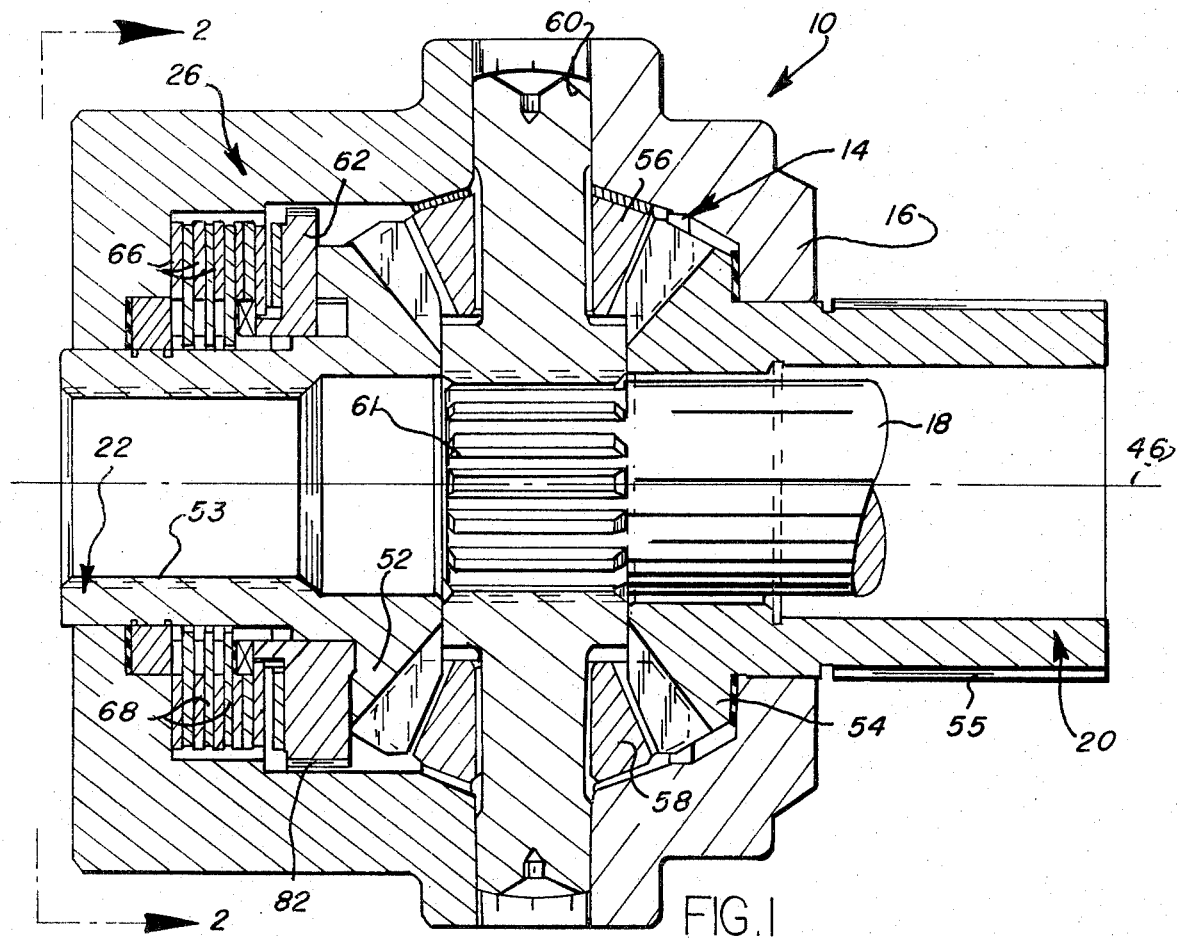
FIG. 1 is a sectional view of a differential drive mechanism constructed in accordance with the present invention.

A differential drive assembly 10 constructed in accordance with the present invention is illustrated in FIG. 1 and includes differential gearing 14 which is enclosed within a casing or carrier 16 to drivingly connect an input drive shaft 18 with a pair of driven output members 20, 22. Upon the occurrence of a predetermined rate of rotation of one of the driven members relative to the drive shaft 18, an actuator assembly 24 (see FIGS. 2, 3 and 5) effects operation of a main clutch assembly 26 (FIG. 1) to an engaged condition to retard relative rotation between the driven members and drive shaft.

Figures 5, 7:
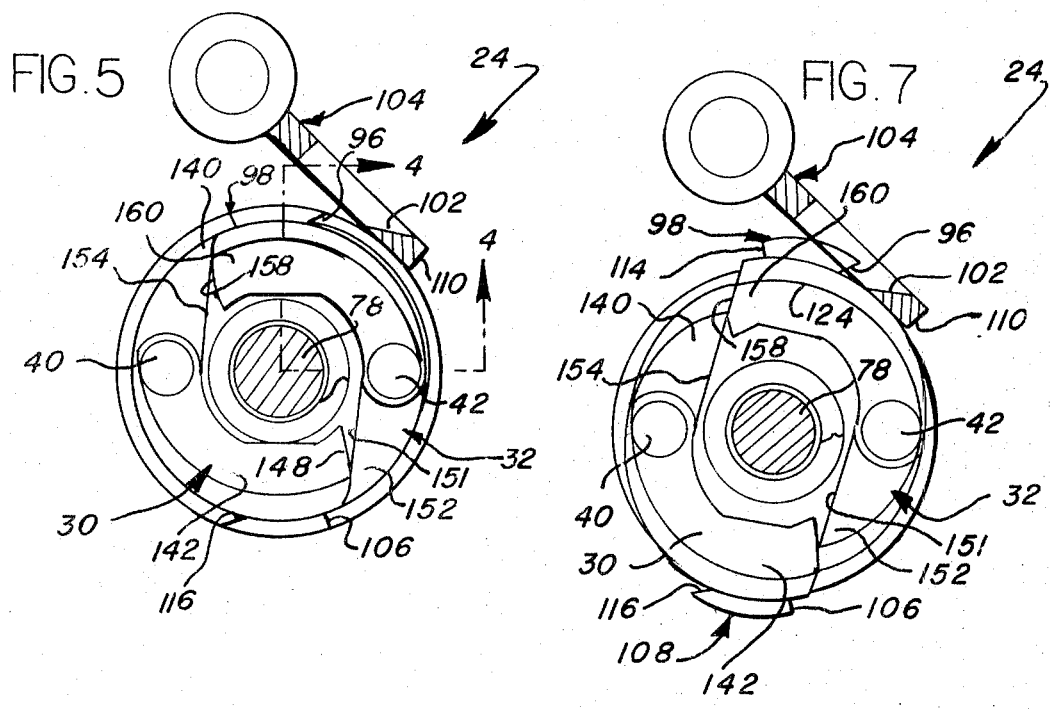
FIG. 5 is a sectional view, taken generally along line 5—5 of FIG. 3, illustrating the relationship between a pair of retracted flyweights and a stop element in the actuator assembly.
FIG. 7 is a sectional view, generally similar to FIG. 5, illustrating the relationship between the flyweights and a stop element when the flyweights are in an extended condition.

The actuator assembly 24 includes a pair of identical flyweights 30 and 32 which are urged to the retracted condition of FIG. 5 by a pair of annular biasing springs 34 and 35 (see FIG. 3) which encircle or circumscribe both of the flyweights. Upon the occurrence of relative rotation between the driven members and the drive shaft 18, the flyweights 30 and 32 are simultaneously moved outwardly against the influence of the biasing springs 34 and 35 toward the extended condition of FIG. 7. A pair of cup-shaped stop members 36 and 38 (see FIG. 4) are provided to limit the outward movement of the flyweights 30 and 32 so that they do not interfere with other portions of the drive mechanism and to limit the loading on pivot connections 40 and 42 which connect the flyweights with the cup-shaped stop members 36 and 38 in the manner illustrated in FIG. 4.

During operation of the differential drive assembly 10, the drive shaft 18 is rotated by a prime mover (not shown). Rotation of the drive shaft 18 drives cross shaft 60 through the splined connection 61. Cross shaft 60 in turn drives carrier 16 so that all these members rotate in unison about central axis 46 (FIG. 1) to transmit drive forces to the differential gearing 14. Assuming that the driven members are being rotated at the same speed, drive forces are transmitted from the casing 16 to a pair of side gears 52 and 54 by pinion gears 56 and 58 which are connected with the carrier 16 by a pinion shaft 60. The side gears 52 and 54 are integral with driven members 22, 20 and may in turn be directly connected with either output or axle shafts (not shown) by spline connections 53 and 55 respectively.

Upon a slipping or rotation of one of the driven members 20, 22 relative to the other as in a slipping wheel condition, the associated side gear 52 or 54 is accelerated relative to the other side gear. When this occurs, the actuator assembly 24 engages the main clutch assembly 26 (FIG. 1) by retarding rotation of an annular wedge member 62 relative to the carrier 16. Retarding rotation of the wedge member 62 relative to the carrier 16 causes an annular undulating cam or wedging surface formed on the side gear 52 to press the annular wedge member 62 toward the left (as viewed in FIG. 1). This leftward movement of the wedge member 62 presses a plurality of annular friction discs 66 connected with the carrier 16 against a plurality of annular friction discs 68 connected with side gear 52 in the manner disclosed in U.S. Pat. No. 3,606,803. Frictional forces transmitted between the friction discs 66 and 68 retard relative rotation between the side gear 52 and carrier 16. Since the side gear 54 is connected with the side gear 52 through the two pinion gears 56 and 58, relative rotation between the side gear and carrier 16 is also retarded by engagement by the main clutch assembly 26.

The actuator assembly 24 is effective to operate the main clutch assembly 26 to the engaged condition upon the occurrence of a predetermined rate of relative rotation between one of the side gears 52 or 54 and the carrier 16. The actuator assembly 24 includes a drive arrangement 74 (FIG. 3) which effects rotation of the flyweights 30 and 32 about a central axis 76 of the actuator assembly 24 and actuator shaft or actuator drive member 78. The drive member or shaft 78 is rotatably mounted on the carrier 16 and includes a plurality of gear teeth 80 which mesh with an annular array of gear teeth 82 (see FIG. 1) on the wedge member 62.

When relative rotation occurs between the side gear 52 and carrier 16, the drive member 78 is rotated by the gear teeth 82. Rotation of the actuator drive member 78 rotates the cup-shaped stop members 36 and 38 through secondary clutches 88 and 90. Since the flyweights 30 and 32 are pivotally mounted on the cup-shaped stop members 36 and 38, the flyweights are rotated about the central axis 76 of the actuator drive member 78 with the stop members at a speed which varies as a function of variations in the speed or relative rotation between the driven members 20, 22.

As the flyweights 30 and 32 are rotated about the central axis 76 of the actuator drive shaft 78, the flyweights are both subjected to a centrifugal force which varies as a function of variations in the rate of relative rotation between the drive shaft 18 and driven members 20, 22. This centrifugal force urges both of the flyweights simultaneously outward from the retracted condition of FIG. 5 toward the extended condition of FIG. 7. Thus, when the actuator drive shaft 78 is rotated in either a clockwise or a counterclockwise direction, the flyweights 30 and 32 are both subjected to a centrifugal force which tends to urge both of them simultaneously outwardly from the retracted condition to the extended condition.

When the flyweights 30 and 32 have been moved outwardly to the extended condition under the influence of a centrifugal force resulting from rotation of the actuator drive shaft 78 in a clockwise direction as viewed in FIG. 7, a stop surface 96 on an outwardly projecting portion 98 of the flyweight 32 is moved into abutting engagement with an angled stop surface 102 on a stop element 104 by continued clockwise rotation of the actuator shaft 78. Similarly, if the flyweights 30 and 32 are moved to the outward condition under the influence of counterclockwise rotation of the actuator drive shaft 78 (as viewed in FIG. 7), a stop surface 106 on an outwardly projecting portion 108 of the flyweight 30 is moved into abutting engagement with a second stop surface 110 on the stop element 104.

If the positions of the identical flyweights 30 and 32 were advanced by 180° from the positions illustrated in FIG. 7 when the flyweights initially moved to their extended condition, a stop surface 114 on the end portion 98 of the flyweight 32 would move into abutting engagement with the stop surface 110 during continued counterclockwise rotation of the actuator drive shaft 78. Similarly, if the input shaft were rotating in a clockwise direction and the identical flyweights 30 and 32 were advanced by 180° from position shown in FIG. 7, a stop surface 116 of the flyweight 30 could move into abutting engagement with the stop surface 102 and the stop element 104 during continued clockwise rotation of the actuator shaft 78.

Upon engagement of a stop surface on one of the flyweights 30, or 32 with the stop element 104, the stop element 104 retards rotation of the actuator drive shaft 78. Since the teeth 80 on the actuator drive shaft 78 are disposed in meshing engagement with the teeth 82 on the wedge member 62, rotation of the wedge member 62 is also retarded. When rotation of the wedge member 62 is retarded relative to the side gear 52, the cam or wedging surfaces on the side gear 52 press the wedge member 62 axially toward the left (as viewed in FIG. 1) to engage the main clutch assembly 26 and hold the side gear 52 against rotation relative to the carrier 16.

The cup-shaped stop members 36 and 38 limit the outward movement of the flyweights 30 and 32 under the influence of centrifugal force. Thus, arcuate outer surfaces 122 and 124 on the flyweight 32 (see FIG. 4) move outwardly into engagement with annular stop surfaces 126 and 128 on the cup-shaped stop members 36 and 38. When the outer surfaces 122 and 124 on the flyweight 32 have engaged the stop surfaces 126 and 128, the flyweight is held against further outward movement. Similarly, arcuate outer surfaces on the flyweight 30 engage the annular surfaces 126 and 128 as the flyweight 30 moves outwardly to thereby limit outward movement of the flyweight 30.

The secondary clutches 88 and 90 (see FIG. 4) formed between the stop members 36 and 38 and the input shaft 78 prevent the gear teeth 80 on the input shaft from being overloaded upon engagement of one of the flyweights 30 or 32 with the stop element 104. Since slippage can occur between the cup-shaped stop members 36 and 38 and the actuator shaft 78 at the secondary clutches 88 and 90 upon the application of a predetermined torque load to the input shaft and stop members, the secondary clutches 88 and 90 limit the load which can be transmitted between the input shaft and stop members to thereby limit the load applied to the gear teeth 80. The manner in which the flyweights 30 and 32 cooperate with the cup-shaped stop members 36 and 38 and the clutch assembly 26 is similar to that disclosed in U.S. Pat. application Ser. No. 374,532, filed June 28, 1973, by Jerry F. Baremor, and entitled "Differential Drive Mechanism" which is to be considered as being incorporated herein in its entirety by this reference thereto.

In accordance with a feature of the present invention, the flyweights 30 and 32 are moved outwardly from the retracted condition of FIG. 5 to the extended condition of FIG. 7 under the influence of only the centrifugal force resulting from rotation of the flyweights about the axis 76 of the actuator drive shaft 78 and actuator assembly 24. The centrifugal force which is applied to the flyweights 30 and 32 due to rotation of the actuator assembly 24 about the central axis 46 (FIG. 1) of the carrier 16 is ineffective to cause the flyweights to move outwardly. Since the actuator shaft 78 is rotated at a speed which varies as a function of variations in the speed of relative rotation between the drive shaft 18 and driven members 20, 22 the flyweights 30 and 32 are moved outwardly under the influence of a centrifugal force which varies only as a function of variations in the speed of relative rotation between the drive shaft 18 and the driven members.

Figure 2:
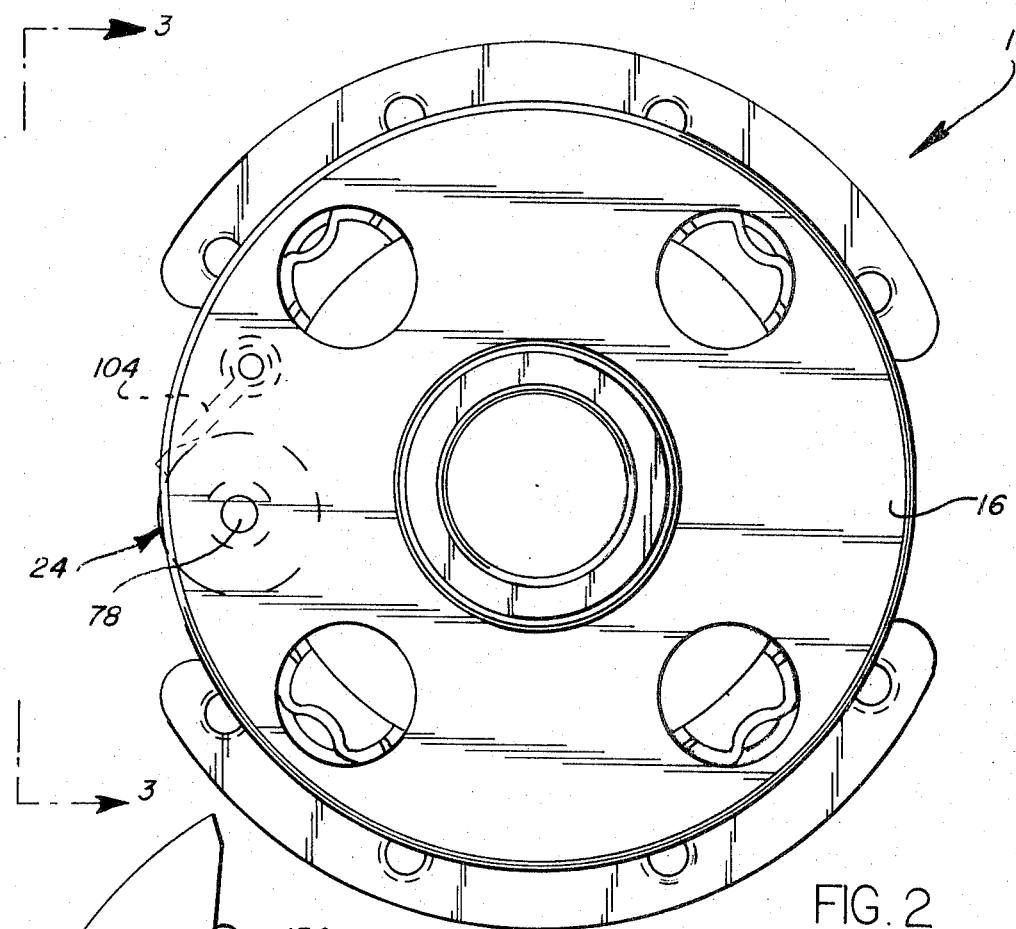
FIG. 2 is an end view, taken generally along line 2—2 of FIG. 1, illustrating the relationship between a carrier or casing and an actuator assembly constructed in accordance with the present invention.

The central axis 76 of the actuator assembly 24 extends parallel to the central axis 46 of the carrier 16. However, the actuator assembly 24 is displaced to one side of the carrier 16 (FIG. 2). Therefore, upon rotation of the carrier 16 about its central axis 46, the actuator assembly 24 is subjected to an outwardly directed centrifugal force which tends to move an outermost flyweight, for example the flyweight 32 of FIG. 5, outwardly and to move the innermost flyweight, in the example of the flyweight 30, inwardly toward the shaft 78. Since the carrier 16 rotates at a relatively high speed during the transmission of drive forces from the drive shaft 18 to the driven members 20, 22 without relative rotation between the drive shaft and driven members. The outer flyweight is subjected to relatively large outward component of force and if unrestrained would move the retracted position of FIG. 5 to the extended position of FIG. 7 while the other flyweight would remain retracted. If this was allowed to occur, even a slight degree of relative rotation between the drive shaft 18 and driven members 20, 22 would cause the actuator shaft 78 to rotate and move the already outwardly extended flyweight into abutting engagement with the stop element 104.

To prevent outward movement of a flyweight under the influence of carrier rotation, the two flyweights 30 and 32 cooperate in such a manner that both of the flyweights must move simultaneously outwardly from the retracted condition of FIG. 5 to the extended condition of FIG. 7. Rotation of the carrier 16 about its central axis 46 subjects the flyweights 30 and 32 to a centrifugal force which urges one of the flyweights inwardly and one of the flyweights outwardly. Since both of the flyweights 30 and 32 are not urged outwardly under the influence of this centrifugal force, the flyweight which is urged inwardly holds the flyweight which is urged outwardly against outward movement.

Upon rotation of the shaft 78 due to the relative rotation between the input drive shaft 18 and the driven members 20, 22, flyweights 30 and 32 are rotated about the central axis 76 of the actuator assembly 24. This rotation causes both of the flyweights to be urged outwardly by the resulting centrifugal force. The flyweights 30 and 32 cooperate in such a manner that they can both move simultaneously outwardly under the influence of centrifugal force. Therefore, the flyweights 30 and 32 can move from the retracted condition of FIG. 5 to the extended condition of FIG. 7 under the influence of the centrifugal force resulting from rotation of the actuator shaft 78 even though they will not move outwardly from the retracted condition under the influence of centrifugal force resulting from rotation of the actuator assembly 24 with the carrier 16 about the axis 46 of the carrier.

Figure 6:
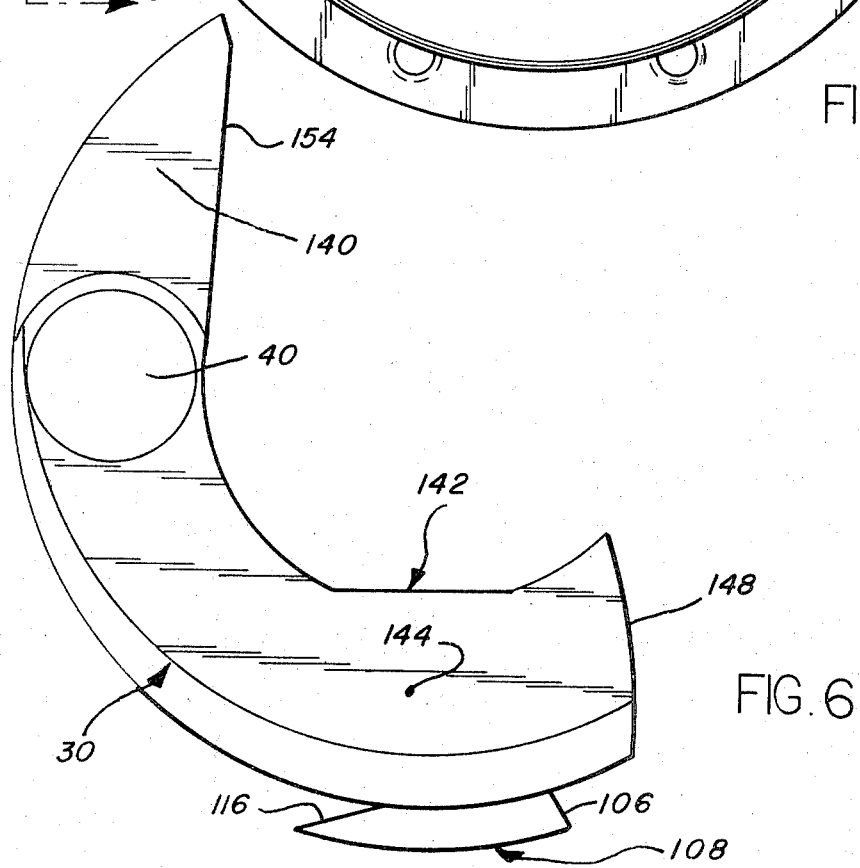
FIG. 6 is an enlarged plan view of one of the flyweights.

The flyweight 30 (FIG. 6) includes a tail portion 140 which extends outwardly in one direction from the pivot connection 40 and a body portion 142 which extends outwardly from the pivot connection 40 in the opposite direction. The tail portion 140 has a relative small transverse dimension so that it has a relatively small weight. The center of gravity of the flyweight 30 is approximately at the point indicated by the numeral 144 in FIG. 6. The body portion 142 of the flyweight 30 has an arcuate face surface 148 which engages a surface 151 of a tail portion 152 of the flyweight 32 when the flyweights are in the retracted condition of FIG. 5. The tail portion 140 of the flyweight 30 has a holding or retaining surface 154 which engages an end or face surface 158 of the body portion 160 of the flyweight 32 when the flyweights are retracted. It should be noted that the tail portions 140 and 152 of the flyweights 30 and 32 engage the face surfaces 148 and 158 on the other of the two flyweights when the identical flyweights 30 and 32 are in the retracted condition of FIG. 5.

In order for one of the flyweights to move outwardly from the retracted condition toward the extended condition, it is necessary for the other flyweight to move outwardly at the same time. This is because both of the flyweights move outwardly in a clockwise direction (as viewed in FIG. 5) about their pivot connections 40 and 42. Therefore, if both of the flyweights 30 and 32 are subjected to a centrifugal force which tends to move both of them outwardly, the face surface 148 of the flyweight 30 is moved along an arcuate path toward the left (as viewed in FIG. 5). The tail 152 of the flyweight 32 also tends to move toward the left along an arcuate path. Therefore, as the body 142 of the flyweight 30 moves in a clockwise direction about the pivot connection 40, it is followed by the clockwise movement of the tail 152 of the flyweight 32 about the pivot connection 42. Similarly as the flyweight 30 and 32 move outwardly, the body 160 of the flyweight 32 moves in a clockwise direction or toward the right (as viewed in FIG. 5) along an arcuate path. The tail 140 of the flyweight 30 also moves in a clockwise direction or toward the right (as viewed in FIG. 5).

If only one of the flyweights 30 or 32 tends to move outwardly under the influence of a centrifugal force due to rotation about the central axis 46 of the carrier 16, the other flyweight out059its outward movement. For example, if it is assumed that the flyweight 32 is urged outwardly while the flyweight 30 is urged inwardly by a centrifugal force resulting from rotation about the axis 46 which extends parallel to the longitudinal axis 76 of the drive shaft 78, the face surface 148 on the body 142 of the flyweight 30 will not move out of the way of the tail 152 of the flyweight 32. Therefore, the surface 151 on the tail 152 of the flyweight 32 presses against the face surface 148 of the flyweight 30 to retain the flyweight 32 against movement about the pivot connection 42. Of course, if the flyweight 30 was subjected to a centrifugal force urging it outwardly while the flyweight 32 was subjected to a centrifugal force urging it inwardly, outward movement of the flyweight 30 would be blocked by engagement of the tail 140 of the flyweight 30 with the face surface 158 of the flyweight 32.

Rotation of the carrier 16 a42the axis 46 results in the application of a centrifugal force to the stop element 104. This centrifugal force could tend to move the stop element 104 away from the actuator assembly 24 so that the stop portions 98 and 108 on the flyweights 30 and 32 would not engage the stop element 104 when the flyweights are in the extended condition of FIG. 7.

Figure 3:
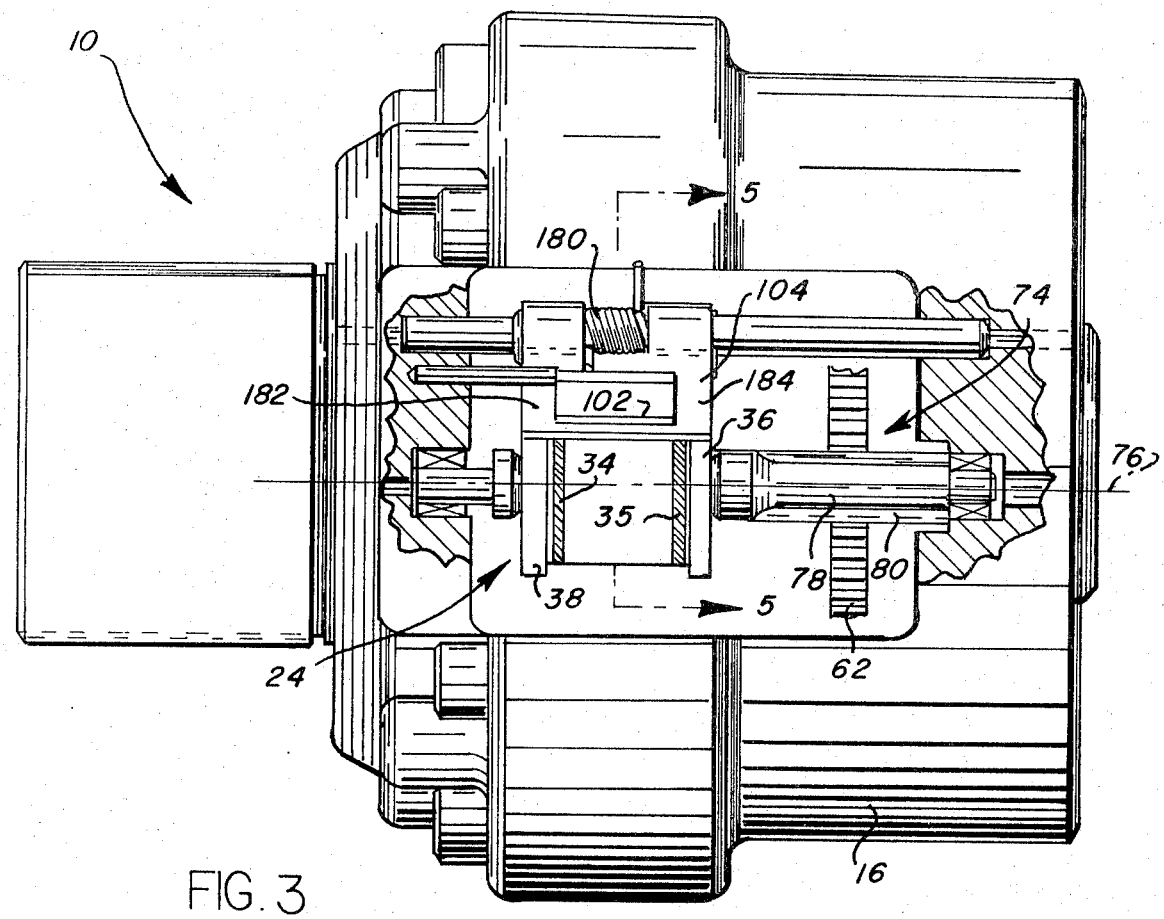
FIG. 3 is a partially broken away side view, taken generally along line 3—3 of FIG. 2, and further illustrating the relationship between the actuator assembly and the carrier.
Figure 4:
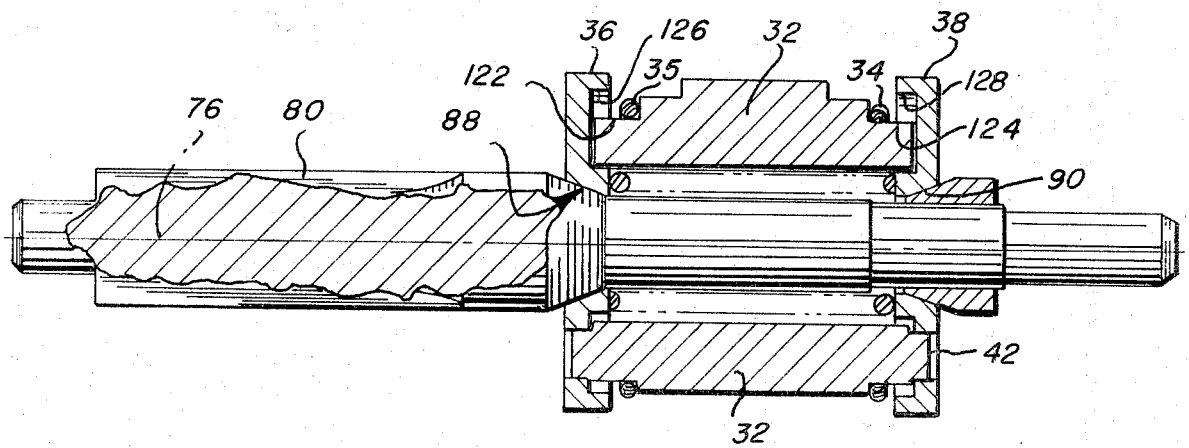
FIG. 4 is an enlarged sectional view, taken generally along line 4—4 of FIG. 5, illustrating the relationship between an input shaft to the actuator assembly and a flyweight driven by the input shaft.

To prevent this from happening, the stop element 104 is pressed against the cup-shaped stop members 36 and 38 by a retaining spring 180 (see FIG. 3). The stop element 104 has side portions 182 and 184 which engage the cup-shaped stop members 36 and 38. Since the cup-shaped stop members 36 and 38 have circular outer surfaces, the cup-shaped stop members slide along the inner surface of the side portions 182 and 184 of the stop element 104 upon rotation of the actuator shaft 78 of the actuator 24. The stop surface 102 is formed on the inside of the rectangular opening in the stop element 104 and extends between the two side sections 182 and 184.

In view of the foregoing description, it is apparent that during the transmission of power between the drive shaft 18 and driven shafts, the carrier 16 is rotated about its central axis 46. Upon an occurrence of a predetermined rate of relative rotation between the drive shaft 18 and driven shafts, the actuator assembly 24 is effective to initiate operation of the main clutch 26 to an engaged condition to retard the relative rotation. The actuator assembly 24 includes a pair of flyweights 30 and 32 which are rotated about a central axis 76 of the actuator assembly at a speed which varies as a function of variations in the rate of relative rotation between the drive shaft 18 and driven shafts. The flyweights 30 and 32 are subjected to two centrifugal forces; that is, a centrifugal force resulting from rotation of the flyweights with the carrier 16 about its central axis 46 and a centrifugal force resulting from rotation of the flyweights about the central axis 76 of the actuator assembly 24.

The present invention prevents outward movement of the flyweights 30 and 32 under the influence of the centrifugal force resulting from carrier rotation. The flyweights 30 and 32 move outwardly only under the influence of the centrifugal force resulting from rotation of the flyweights about the central axis 76 of the actuator assembly. Therefore, the flyweights move outwardly and initiate engagement of a clutch assembly 26 only when a predetermined speed of relative rotation is present between the ring gear and axle shafts.

Rotation of the carrier 16 about its central axis subjects the flyweights 30 and 32 to a centrifugal force tending to urge one of the flyweights outwardly and the other of the flyweights inwardly. To prevent outward movement of the one flyweight under the influence of centrifugal force resulting from carrier rotation, the flyweights 30 and 32 have surfaces on their tail and body portions which cooperate in such a manner as to prevent outward movement of only one flyweight.

At a time when the flyweights 30 and 32 are being rotated about the central axis 76 of the actuator assembly 24, the flyweights are subjected to a centrifugal force which tends to move both of the flyweights simultaneously outwardly. The surfaces on the tail and body portions of the flyweights cooperate to enable both of the flyweights to rotate about their pivot connections 40 and 42 and move simultaneously outwardly under the influence of this centrifugal force.

Although the specific preferred embodiment of the invention illustrated in the drawings and described herein is associated with a vehicle having a four wheel drive arrangement, it is contemplated that the present invention could be used in association with a rear axle differential of a vehicle having a two wheel drive arrangement. In such an environment a ring gear would be connected with the carrier in a known manner and the spline connection 61 would be eliminated.

Having described a specific preferred embodiment of the invention, the following is claimed:

1. A drive mechanism for interconnecting rotatable driving and driven members, said drive mechanism comprising gear means for transmitting drive forces between the driving and driven members and for enabling relative rotation to occur between the driving and driven members, rotatable carrier means connected with said gear means, said carrier means being rotatable about a first axis during the transmission of drive forces between the driving and driven members, clutch means operable between an engaged condition in which said clutch means is effective to retard relative rotation between said driving and driven members and a disengaged condition, and actuator means for effecting operation of said clutch means from the disengaged condition to the engaged condition in response to a predetermined rate of relative rotation between the driving and driven members, said actuator means being rotatable with said carrier means about said first axis and including a rotatable first flyweight, drive means for rotating said first flyweight about a second axis at a speed which varies as a function of variations in the speed of relative rotation between the driving and driven members, means for effecting operation of said clutch means from the disengaged condition to the engaged condition upon outward movement of said first flyweight away from said second axis, and means for preventing outward movement of said first flyweight away from said second axis under the influence of centrifugal force resulting from rotation of said first flyweight about said first axis with said carrier means and for enabling said first flyweight to move outwardly away from said second axis under the influence of centrifugal force resulting from rotation of said first flyweight about said second axis.

2. A drive mechanism as set forth in claim 1 wherein said actuator means further includes a second flyweight, said means for preventing outward movement of said first flyweight including a portion of said second flyweight.

3. A drive mechanism as set forth in claim 1 further including pivot means for supporting said first flyweight for pivotal movement about a third axis, said first flyweight including a first portion disposed on one side of said pivot means and a second portion disposed on another side of said pivot means, said means for preventing outward movement of said first flyweight including means for engaging said second portion of said first flyweight and preventing pivotal movement of said first flyweight about said third axis.

4. A drive mechanism as set forth in claim 3 wherein said actuator means further includes stop means for engaging said first portion of said first flyweight upon outward movement of said first flyweight away from said second axis and for stopping rotation of said first flyweight about said second axis upon outward movement of said first flyweight.

5. A drive mechanism as set forth in claim 4 wherein said first flyweight includes first surface means for engaging said stop means upon outward movement of said first flyweight during rotation of said first flyweight in one direction about said second axis and second surface means for engaging said stop means upon outward movement of said first flyweight during rotation of said first flyweight about said second axis in a direction opposite to said one direction.

6. A drive mechanism as set forth in claim 4 wherein said actuator means includes means for effecting operation of said main clutch means to the engaged condition in response to a stopping of rotation of said first flyweight about said second axis.

7. A drive mechanism as set forth in claim 3 further including means for engaging said first portion of said first flyweight and limiting the extent of outward movement of said first flyweight under the influence of centrifugal force resulting from rotation of said first flyweight about said second axis.

8. A drive mechanism as set forth in claim 1 wherein said actuator means includes a rotatable second flyweight, said drive means being effective to rotate said second flyweight about said second axis at a speed which varies as a function of variations in the speed of relative rotation between the driving and driven members, said means for preventing outward movement of said first flyweight comprising a portion of said second flyweight which is engaged by said first flyweight, and means for preventing outward movement of said second flyweight away from said second axis under the influence of centrifugal force resulting from rotation of said second flyweight about said first axis with said carrier means, said means for preventing outward movement of said second flyweight comprising a portion of said first flyweight which is engaged by said second flyweight.

9. A drive mechanism as set forth in claim 8 further including biasing means for applying a biasing force to said first and second flyweights to yieldingly restrain said first and second flyweights against outward movement, said biasing means including an annular spring which circumscribes said first and second flyweights.

10. A drive mechanism for interconnecting rotatable driving and driven members, said drive mechanism comprising gear means for transmitting drive forces between the driving and driven members and for enabling relative rotation to occur between the driving and driven members, clutch means operable between an engaged condition in which said clutch means is effective to retard relative rotation between said driving and driven members and a disengaged condition, and actuator means for effecting operation of said clutch means from the disengaged condition to the engaged condition, said actuator means including first and second flyweights, means for supporting said first and second flyweights for outward movement from a retracted condition to an extended condition under the influence of centrifugal force, and means for preventing outward movement of one of said flyweights under the influence of a centrifugal force which tends to move only said one of said flyweights outwardly and for enabling both of said flyweights to move simultaneously outwardly under the influence of centrifugal force which tends to move both of said flyweights outwardly.

11. A drive mechanism as set forth in claim 10 wherein said means for preventing outward movement of one of said flyweights includes first surface means disposed on said first flyweight for engaging said second flyweight and retaining said second flyweight against outward movement under the influence of a centrifugal force which tends to move said second flyweight outwardly and said first flyweight inwardly, and second surface means disposed on said second flyweight for engaging said first flyweight and retaining said first flyweight against outward movement under the influence of a centrifugal force which tends to move said first flyweight outwardly and said second flyweight inwardly.

12. A drive mechanism as set forth in claim 11 wherein said means for supporting said first and second flyweights includes first pivot means for supporting said first flyweight for pivotal movement between the retracted and extended conditions and second pivot means for supporting said second flyweight for pivotal movement between the retracted and extended conditions, said first flyweight including a first end portion extending in one direction from said first pivot means and a second end portion extending in another direction from said first pivot means, said first flyweight having a configuration such that its center of gravity is disposed in said first end portion, said first surface means being disposed on said second end portion of said first flyweight, said second flyweight including a third end portion extending in one direction from said second pivot means and a fourth end portion extending in another direction from said second pivot means, said second flyweight having a configuration such that its center of gravity is disposed in said third end portion, said second surface means being disposed on said fourth end portion of said second flyweight.

13. A drive mechanism as set forth in claim 12 wherein said first surface means is engagable with said third end portion of said second flyweight to prevent outward movement of said second flyweight from the retracted condition to the extending condition, said second surface means being engagable with said first end portion of said first flyweight to prevent outward movement of said first flyweight from the retracted condition to the extended condition.

14. A drive mechanism as set forth in claim 10 further including spring means circumscribing said first and second flyweights for urging said first and second flyweights toward the retracted condition.

15. A drive mechanism for interconnecting rotatable driving and driven members, said drive mechanism comprising gear means for transmitting drive forces between the driving and driven members and for enabling relative rotation to occur between the driving and driven members, rotatable carrier means connected with said gear means, said carrier means being rotatable about a first axis during the transmission of drive forces between the driving and driven members, clutch means operable between an engaged condition in which said clutch means is effective to retard relative rotation between said driving and driven members and a disengaged condition, and actuator means for effecting operation of said clutch means from the disengaged condition to the engaged condition in response to a predetermined rate of relative rotation between the driving and driven members, said actuator means being rotatable with said carrier means about said first axis and including a first and second rotatable flyweights, drive means for rotating said first and second flyweights about a second axis at a speed which varies as a function of variations in the speed of relative rotation between the driving and driven members, means for effecting operation of said clutch means from the disengaged condition to the engaged condition upon outward movement of at least one of said flyweights from said second axis, first means connected with said first flyweight for preventing outward movement of said second flyweight under the influence of centrifugal force resulting from rotation of said second flyweight about said first axis, and second means connected with said second flyweight for preventing outward movement of said first flyweight under the influence of centrifugal force resulting from rotation of said first flyweight about said first axis.

16. A drive mechanism as set forth in claim 15 wherein said first means includes first surface means disposed on said first flyweight for engaging said second flyweight and retaining said second flyweight against outward movement, said second means including second surface means disposed on said second flyweight for engaging said first flyweight and retaining said first flyweight against outward movement.

17. A drive mechanism as set forth in claim 15 wherein said first and second means are ineffective to prevent simultaneous outward movement of said first and second flyweights under the influence of centrifugal force resulting from rotation of said first and second flyweights about said second axis.

18. A drive means as set forth in claim 15 wherein said means for effecting operation of said clutch means includes a stop member, said first and second flyweights each including a first stop surface for engaging said stop member upon outward movement of said flyweights during rotation of said flyweights in a first direction about said second axis and a second stop surface for engaging said stop member upon outward movement of said flyweights during rotation of said flyweights in a second direction about said second axis.

19. A drive means as set forth in claim 15 further including spring means circumscribing said first and second flyweights for applying a biasing force to said first and second flyweights tending to retard outward movement of said first and second flyweights.

* * * * *

UNITED STATES PATENT OFFICE
CERTIFICATE OF CORRECTION

Patent No. 3,845,672   Dated November 5, 1974

Inventor(s) Edward J. Goscenski, Jr.

It is certified that error appears in the above-identified patent and that said Letters Patent are hereby corrected as shown below:

Column 8, line 6, "out059" should read -- blocks --;

line 24, "a42" should read -- about --.

Signed and sealed this 14th day of January 1975.

(SEAL)
Attest:

McCOY M. GIBSON JR.
Attesting Officer

C. MARSHALL DANN
Commissioner of Patents